United States Patent [19]

Okumichi et al.

[11] 4,309,338
[45] Jan. 5, 1982

[54] PROCESS FOR PREPARING AQUEOUS DISPERSION OF ROSIN-BASE MATERIALS

[75] Inventors: Toshiharu Okumichi, Suita; Kimio Kawatani, Daito, both of Japan

[73] Assignee: Arakawa Kagaku Kogyo Kabushiki Kaisha, Japan

[21] Appl. No.: 201,762

[22] Filed: Oct. 29, 1980

Related U.S. Application Data

[62] Division of Ser. No. 113,604, Jan. 21, 1980, Pat. No. 4,267,099.

[30] Foreign Application Priority Data

Feb. 7, 1979 [JP] Japan .................................. 54-13516
Mar. 28, 1979 [JP] Japan .................................. 54-37567

[51] Int. Cl.$^3$ ........................ C09F 1/04; C08L 93/04
[52] U.S. Cl. .................................... 260/101; 260/97; 106/238
[58] Field of Search .................... 260/97, 101; 106/238

[56] References Cited

U.S. PATENT DOCUMENTS 3,132,127 5/1964 Strazdius .............................. 260/97
3,400,117 9/1968 D'Errico et al. ..................... 260/101
3,463,768 8/1969 Strazdius .............................. 260/97

FOREIGN PATENT DOCUMENTS 2816827 10/1978 Fed. Rep. of Germany ...... 106/238
544656 4/1979 United Kingdom .

OTHER PUBLICATIONS

Japan Published Unexamined Patent Application, (Kokai), No. 77206/77.

*Primary Examiner*—H. S. Cockeram
*Attorney, Agent, or Firm*—Larson and Taylor

[57] ABSTRACT

This invention provides a process for preparing an aqueous dispersion of a rosin-base material by a so-called inversion method, the process being characterized in that the dispersant is at least one member selected from the group consisting of:

(a) salt of sulfonic acid represented by the formula

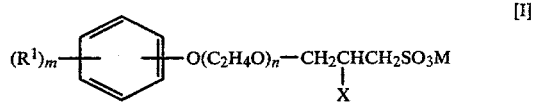

[I]

wherein $R^1$ is a hydrocarbon residue having 4 to 18 carbon atoms, m is an integer of 1 or 2, n is an integer of 4 to 25, X is hydrogen or hydroxyl, and M is a monovalent cation, and (b) salt of sulfuric acid half ester represented by the formula

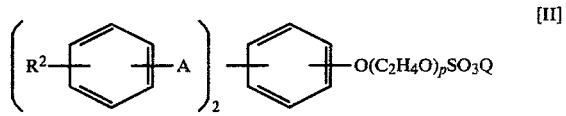

[II]

wherein $R^2$ is hydrogen or lower alkyl, A is straight-chain or branched-chain alkylene having 2 to 3 carbon atoms, p is an integer of 4 to 25, and Q is a monovalent cation.

The aqueous dispersion obtained by the process of the invention have excellent sizing effects, very high storage, mechanical and dilution stabilities, and greatly reduced foaming properties.

9 Claims, No Drawings

PROCESS FOR PREPARING AQUEOUS DISPERSION OF ROSIN-BASE MATERIALS

This is a division of application Ser. No. 113,604 filed Jan. 21, 1980 and now U.S. Pat. No. 4,267,099.

This invention relates to a process for preparing aqueous dispersions of rosin-base materials, and more particularly to a process for preparing aqueous dispersions of rosin-base materials by an inversion method with use of specified dispersants.

Papers, paper boards, wood fiber boards and like cellulose fiber products are produced usually from aqueous slurry of cellulose fibers containing sizing agents admixed therewith. Generally these sizing agents comprise rosin-base materials, especially fortified rosin, since such sizing agents are capable of giving the product excellent sizing effects, such as high resistance to water and to the penetration of ink. The processes for preparing fortified rosin sizing agents can be divided into the following two general types: one in which a fortified rosin is dispersed in water in the presence of a suitable dispersant by a homogenizer with a high-pressure shearing force, and the other in which a melt of the rosin-base material, a dispersant and water are mixed together to form a dispersion comprising a continuous phase of the rosin-base material and a dispersed phase of the water, and to the dispersion water is added to invert the dispersion to the contemplated aqueous dispersion comprising a dispersed phase of the rosin-base material and a continuous phase of the water. This latter process is a so-called inversion method.

The inversion method has the advantage of giving aqueous dispersions of rosin-base materials without using any homogenizer or like special device. However, processes still remain to be proposed for preparing by the inversion method aqueous dispersions of rosin-base materials having reduced susceptibility to foaming and outstanding in storage, mechanical and dilution stabilities as well as in sizing effects.

Accordingly an object of the present invention is to provide a process for preparing by the inversion method aqueous dispersions of rosin-base materials which have reduced susceptibility to foaming.

Another object of the invention is to provide a process for preparing by the inversion method aqueous dispersion of rosin-base materials having outstanding sizing effects.

Still another object of the invention is to provide a process for preparing by the inversion method aqueous dispersions of rosin-base materials which are outstanding in storage, mechanical and dilution stabilities.

These and other objects of the invention will become apparent from the following description.

This invention provides a process for preparing an aqueous dispersion of a rosin-base material by mixing together a melt of the rosin-base material, a dispersant and water to obtain a dispersion comprising a continuous phase of the rosin-base material and a dispersed phase of the water, and adding water to the dispersion to invert the dispersion to the contemplated aqueous dispersion comprising a dispersed phase of the rosin-base material and a continuous phase of the water, the process being characterized in that the dispersant is at least one member selected from the group consisting of:

(a) salt of sulfonic acid represented by the formula

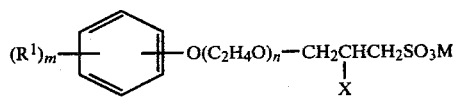

wherein $R^1$ is a hydrocarbon residue having 4 to 18 carbon atoms, m is an integer of 1 or 2, n is an integer of 4 to 25, X is hydrogen or hydroxyl, and M is a monovalent cation, and (b) salt of sulfuric acid half ester represented by the formula

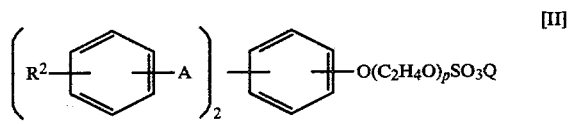

wherein $R^2$ is hydrogen or lower alkyl, A is straight-chain or branched-chain alkylene having 2 to 3 carbon atoms, p is an integer of 4 to 25, and Q is a monovalent cation.

Our research has revealed that whereas the salts of sulfonic acids of the formula [I] (hereinafter referred to as "sulfonates") or the salts of sulfuric acid half ester of the formula [II] (hereinafter referred to as "sulfates") have never been used for the preparation of aqueous dispersions of rosin-base materials, aqueous dispersions of rosin-base materials having reduced foaming properties and improved sizing effects and enhanced stabilities can be prepared by dispersing a rosin-base material in water by the inversion method with use of at least one of the specific compounds of the formulae [I] and [II] as a dispersant.

According to this invention, the following outstanding results can be achieved by using at least one of the sulfonates of the formula [I] and the sulfates of the formula [II] for dispersing rosin-base materials in water by the inversion method. The aqueous dispersions of rosin-base materials obtained by the process of this invention have (a) excellent sizing effects, and (b) very high storage, mechanical and dilution stabilities, and (c) greatly reduced foaming properties. The effects (a) and (b) are attainable even when at least one of the specific dispersants of the formulae [I] and [II] is used in an amount as small as about 2% of the rosin-base material based on the dry weight. The use of the dispersants of the invention in such a small amount produces more greatly reduced foaming properties (c), thereby eliminating the time and labor that would otherwise be needed for defoaming; and also reduces the production costs since the dispersants are generally even more expensive, usually by about several times, than the rosin-base material. Thus the process of the present invention is economically advantageous.

These outstanding effects are achievable only when at least one of the specific dispersants of the formulae [I] and [II] is used but are in no way attainable with use of other compounds which are analogous to such dispersants in chemical structure.

The rosin-base materials to be dispersed in water according to this invention comprise 0 to 95% by weight of rosins and 5 to 100% by weight of fortified rosins. Examples of useful rosins are gum rosin, wood rosin, tall oil rosin, modified products of these rosins and mixtures thereof. Examples of useful modified rosins are hydrogenated rosins, disproportionated rosins, polymerized rosins, aldehyde-modified rosins, etc. Among these rosins, aldehyde-modified rosins, for example, can be prepared in a conventional manner, e.g. by reacting a rosin with 2 to 8% by weight, based on the rosin, of formaldehyde or acetaldehyde in the presence of an acid catalyst, such as sulfuric acid or p-toluenesulfonic acid, at a temperature of about 140° to about 200° C. for 0.5 to 3 hours. Fortified rosins are also known and can be prepared in a conventional manner, for example, by reacting a rosin with an $\alpha,\beta$-unsaturated carboxylic acid in an amount of 2 to 30% by weight, preferably 3 to 15% by weight, based on the rosin with heating at about 150° to 250° C. Examples of useful $\alpha,\beta$-unsaturated carboxylic acids are acrylic acid, maleic acid, fumaric acid, itaconic acid, anhydrides of these acids and mixtures thereof, among which fumaric acid, maleic acid and maleic anhydride are especially preferable. The modified rosins and fortified rosins as well as process for their preparation are disclosed, for example, in U.S. Pat. No. 4,071,375.

The rosin-base materials may be extended if desired by known extenders therefor in a conventional manner. Examples of extenders are paraffin wax, microcrystalline wax and like waxes, petroleum resins, terpene resins, hydrogenated products of such resins, and like hydrocarbon resins. When the rosin-base materials are extended, the extended rosin-base materials preferably comprise at least 25% by weight of fortified rosins and up to 50% by weight of the extenders, based on the combined weight of the rosin-base materials and the extenders.

According to this invention, it is critical to use at least one of the sulfonates of the formula [I] and the sulfates of the formula [II] as a dispersant.

With the sulfonates of the formula [I]

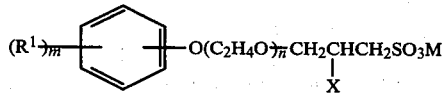

the hydrocarbon residues having 4 to 18 carbon atoms represented by $R^1$ include (i) straight-chain or branched-chain alkyl groups having 4 to 18 carbon atoms, such as butyl, isobutyl, hexyl, octyl, isooctyl, nonyl, isononyl, dodecyl, tetradecyl, hexadecyl, octadecyl, etc., and (ii) aromatic hydrocarbon residues of the formula

wherein $R^3$ is hydrogen or lower alkyl such as methyl, ethyl, propyl, butyl or the like, and B is straight-chain or branched-chain alkylene having 1 to 3 carbon atoms, such as methylene, methylmethylene, dimethylmethylene, ethylene, methylethylene, trimethylene or the like. When $R^1$ is straight-chain or branched-chain alkyl, the total number of carbon atoms of the group $(R^1)_m$ is preferably 4 to 30 and, more preferably 6 to 25 wherein m is 1 or 2. When $R^1$ is an aromatic hydrocarbon residue represented by

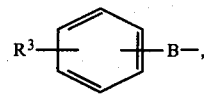

m is preferably 2 and the total number of carbon atoms of the group $(R^1)_m$ is preferably 14 to 20. Typical of preferred groups

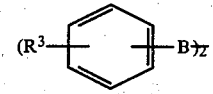

are distyryl

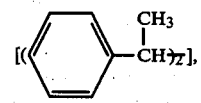

di(p-methylstyryl)

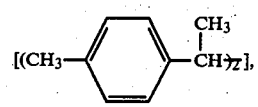

di($\alpha$-methylstyryl)

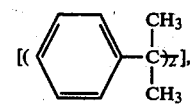

etc. Preferable among the sulfonates of the formula [I] are those in which n is 6 to 17. It is also preferable to use a mixture of at least two sulfonates in which n is 4 to 25 such that the mixture will have an average n value of 6 to 17. The monovalent cations represented by M and contained in the sulfonates of the formula [I] include lithium, sodium, potassium, cesium and like alkali metal ions; ammonium ions derived from ammonia and amines such as trimethylamine, dimethylamine, diethylamine and triethanolamine, etc.

With the sulfates represented by the formula [II]

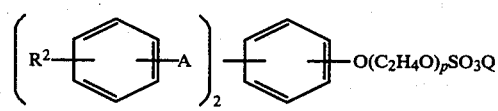

the lower alkyl groups represented by $R^2$ include, for example, methyl, ethyl, propyl, butyl, etc. The alkylene groups represented by A and having 2 to 3 carbon atoms include, for example, methylmethylene, dimethylmethylene, ethylene, methylethylene, trimethylene, etc. Preferred examples of the group are styryl

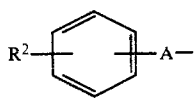

p-methylstyryl

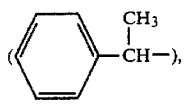

α-methylstyryl

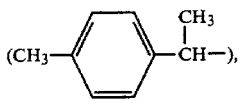

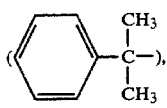

etc. The monovalent cations represented by Q include, for example, lithium, sodium, potassium, cesium and like alkali metal ions; ammonium ions derived from ammonia and amines such as trimethylamine, dimethylamine, diethylamine and triethanolamine, etc., as is the case with the formula [I]. Preferably p is 6 to 20.

At least one of the sulfonates of the formula [I] and the sulfates of the formula [II] is used usually in an amount of about 0.5 to about 10% by weight, preferably about 1 to about 8% by weight, of the rosin-base material based on the dry weight. With less than 0.5% by weight of the dispersant present, insufficient dispersion will tend to result, whereas use of more than 10% by weight of the dispersant is not economical. The specified dispersants of the formulae [I] and [II] have the advantage that the use of at least one of them gives aqueous dispersions with the contemplated properties even if in a small amount, for example, of about 1 to about 2% by weight of the rosin-base material, as stated above.

To practice the process of this invention, a molten rosin-base material is prepared by heating a fortified rosin and, when desired, a rosin and/or an extender, with stirring. Preferably the heating is conducted at a temperature at least about 20° C. higher than the softening point of the rosin-base material. The preferred heating temperature is generally about 90° to about 160° C., although variable depending on the proportions of the fortified rosin, rosin and extender.

Subsequently an aqueous solution of a specified dispersant, or the dispersant and water are added to the molten rosin-base material with stirring to prepare a dispersion in which the continuous phase is the rosin-base material and the dispersed phase is the water. The amount of water to be used is so adjusted that the resulting dispersion will contain about 70 to about 90% by weight of solids.

Hot water (for inversion) having a temperature of about 70° to about 100° C. is then added to the dispersion with vigorous stirring. The phase inversion of the dispersion usually takes place when the amount of water in the resulting dispersion exceeds about 30% by weight of the whole amount of the resulting dispersion, thus giving a dispersion containing the rosin-base material as dispersed in the continuous phase of water.

The aqueous dispersion thus prepared usually comprises about 5 to about 70% by weight, preferably about 30 to about 55% by weight, of the rosin-base material; about 0.5 to about 10% by weight, preferably about 1 to about 8% by weight, based on the rosin-base material, of the dispersant; and the balance water. The dispersion comprises the rosin-base material as uniformly dispersed therein in the form of finely divided particles. The particles preferably are up to 1μ in diameter which are predominantly up to 0.5μ in diameter. The dispersion usually has a milk-white appearance and a pH of about 3.5 to about 5. When desired, water or an aqueous alkali solution can be added to the dispersion for dilution and/or pH adjustment. The alkali solution is used preferably in such an amount that the resulting dispersion will have a pH of up to about 6. The dispersion obtained by the process of the invention remains stable at room temperature for at least 2 months free of any precipitation and possesses greatly reduced susceptibility to foaming that is usually attendant on the use of dispersants. As will be apparent from the Examples given later, the dispersion has high mechanical and dilution stabilities and produces outstanding sizing effects.

The aqueous dispersions obtained by the present process are useful for preparing papers, paper boards, fiber boards, etc. form cellulose fibers and also from mixtures of cellulose fibers and mineral fibers, such as asbestos, rock wool, etc. or synthetic fibers, such as polyamide, polyester, polyolefin and like fibers.

When the aqueous dispersions of this invention are used as papermaking sizing agents, the dispersion is added to an aqueous slurry of pulp along with alum or like fixing agent, and the resulting slurry is made into sheets at a pH of about 4 to about 6. Alternatively, the dispersion is added to an aqueous slurry of pulp along with a small amount of alum or like fixing agent and a very small amount of a cationic auxiliary fixing agent and, the resulting slurry is made into sheets at a pH of about 5 to about 7, as disclosed in British Pat. No. 1,266,829. The present dispersions are usually used in an amount of about 0.05 to about 3% by weight, based on the dry weight, of the pulp. The aqueous dispersions of this invention have high dilution stability which is especially advantageous for papermaking.

The water used for papermaking is usually river water, tap water, well water or like water which are frequently high in hardness, so that the sizing agent is required to have stability in hard water. In view of the cost of transport, the sizing agent is prepared generally in a high concentration and is added in a very small amount to an aqueous slurry of pulp for papermaking as diluted so as to be readily dispersible in the pulp slurry. When diluted, however, the aqueous dispersions of rosin-base material heretofore proposed have low stability particularly in hard water. Because of the low stability, the aqueous dispersions must be uniformly diluted within a short period of time immediately before use and added to the aqueous pulp slurry. This needs a special apparatus for dilution. In contrast, the aqueous dispersions of the present invention have high dilution stability such that they can be satisfactorily diluted with river water, tap water, well water or like hard water without using the special apparatus for dilution, and can be readily and uniformly dispersed in pulp slurries. The diluted dispersions remain stable over a prolonged period of time.

The aqueous dispersions of this invention are usable also as surface sizing agents. In this case, the dispersions are applied to wet sheets of paper in the usual manner as by spraying, immersion or coating.

The process of this invention for preparing aqueous dispersions will be described below in greater detail with reference to Examples and Comparison Examples. Reference Examples show the process for preparing rosin-base materials useful for this invention. In each of the examples the parts and percentages are all by weight unless otherwise indicated.

The properties of the aqueous dispersions are determined by the following methods.

(1) Mechanical stability

A 50 g quantity of the aqueous dispersion is placed into the container of Maron-type stability tester (product of Shinsei Sangyo Co., Ltd., Japan) and subjected to mechanical shear under a load of 10 kg, at 25° C. and at a rotational speed of 1000 r.p.m. for 5 minutes. By the shearing action, agglomerates are formed. The resulting agglomerates are filtered off with a 100-mesh stainless steel screen. The mechanical stability is calculated from the following equation:

$$\text{Mechanical stability (\%)} = \frac{W_1}{W_0} \times 100$$

in which $W_1$ is the weight of completely dried agglomerates, and $W_0$ is the weight of completely dried dispersion specimen.

(2) Dilution stability

The aqueous dispersion is diluted to a concentration of 5% at 25° C. with water having a hardness of 10° DH. The diluted dispersion is checked with the unaided eye to measure the time taken for the flocculation of the dilution.

(3) Foaming properties

The aqueous dispersion is diluted with deionized water to a concentration of 500 ppm, and the dilution is tested according to JIS K 3362 to determine the foaming properties.

Reference Example 1

Tall oil rosin (1800 parts) is melted by heating, and 2.7 parts of p-toluenesulfonate monohydrate serving as a catalyst is added to the molten rosin at 165° C. with stirring. Subsequently 118 parts of 37% aqueous solution of formaldehyde is added to the mixture at 160° to 170° C. over a period of 90 minutes. The mixture is further stirred at the same temperature for 1 hour to obtain formaldehyde-modified rosin, to which 1200 parts of gum rosin is added. The resulting mixture is stirred at 175° C. for 1 hour.

The mixture (2950 parts) and 177 parts of fumaric acid are melted by heating and reacted at 200° C. for 3 hours to give a rosin-base material (I) having an acid value of 208 and a softening point of 103.5° C. as measured by the ring-and-ball method.

REFERENCE EXAMPLE 2

Gum rosin (1000 parts) and 190 parts of fumaric acid are melted and heated at 200° C. for 4 hours for reaction. The resulting fortified rosin has an acid value of 286 and a softening point of 138.5° C.

The fortified rosin (550 parts) and 500 parts of gum rosin are heated at 170° C. and mixed together for 30 minutes to obtain a rosin-base material (II).

EXAMPLES 1 AND 2

The rosin-base material (I) (100 parts) obtained in Reference Example 1 is placed into a flask equipped with a stirrer and a thermomether, and then heated to 150° C. and melted. A 10 part portion (for Example 1) or 20 part portion (for Example 2) of 20% aqueous solution of sodium 2-hydroxy-3-(distyrylphenoxypolyoxyethylene)-propylsulfonate (i.e. a sulfonate of the formula [I] in which n is 13) is added to the molten rosin-base material with stirring over a period of 2 to 3 minutes. During the addition, a considerable amount of water evaporates off, with a reduction of the temperature to 93° C. Subsequently 20 parts of hot water (95° C.) is added to the mixture to afford a creamy water-in-oil dispersion. While stirring the dispersion vigorously, 70 parts of hot water (90° C.) is further added to the dispersion over a period of 1 minute. This gives rise to phase inversion, giving an oil-in-water dispersion, which is rapidly cooled from outside to a temperature of 30° C., then passed through a 100-mesh screen and placed into a glass bottle. No coagulant is found on the screen. The aqueous dispersion thus prepared is found to contain substantially the same amount of rosin-base material as the rosin-base material used. Table 1 shows the properties of the dispersion.

EXAMPLES 3 AND 4

The rosin-base material (I) (100 parts) obtained in Reference Example 1 is placed into a flask equipped with a stirrer and a thermometer, and then heated to 150° C. and melted. A 10 part portion (for Example 3) or 20 part portion (for Example 4) of 20% aqueous solution of ammonium salt of polyoxyethylene (average polymerization degree: 11) distyrylphenylether sulfuric acid half ester (i.e. a sulfate of the formula [II] in which p is 11) is added to the molten rosin-base material with stirring over a period of 2 to 3 minutes. During the addition, a considerable amount of water evaporates off, with a reduction of the temperature to 93° C. Subsequently 20 parts of hot water (95° C.) is added to the mixture to afford a creamy water-in-oil dispersion. While stirring the dispersion vigorously, 70 parts of hot water (90° C.) is further added to the dispersion over a period of 1 minute. This gives rise to phase inversion, giving an oil-in-water dispersion, which is rapidly cooled from outside to a temperature of 30° C., then passed through a 100-mesh screen and placed into a glass bottle. No coagulant is found on the screen. The aqueous dispersion thus prepared is found to contain substantially the same amount of rosin-base material as the rosin-base material used. Table 1 shows the properties of the dispersion.

COMPARISON EXAMPLES 1 TO 4

For comparison, aqueous dispersions are prepared in the same manner as in Examples 1 to 4 except that the dispersant of the formula [II] is replaced by (a) sodium salt of polyoxyethylene(average polymerization degree:

10)nonylphenylether sulfuric acid half ester (for Comparison Examples 1 and 2), or by (b) ammonium salt of polyoxyethylene(average polymerization degree: 10)-monostyrylphenylether sulfuric acid half ester (for Comparison Examples 3 and 4), Table 1 shows the properties of the aqueous dispersions obtained.

TABLE 1

| | Amount* of dispersant (%) | Properties of aqueous dispersion | | | | | Foaming properties (mm) |
|---|---|---|---|---|---|---|---|
| | | Concn. (%) | Particle size ($\mu$) | Stabilities | | | |
| | | | | Mechanical (%) | Dilution (hr) | Storage | |
| Example 1 | 2 | 50.2 | 0.5–1 | 0.9 | >24 | At least 2 months | 22 |
| Example 2 | 4 | 51.5 | 0.3 | 0.2 | " | At least 2 months | 36 |
| Example 3 | 2 | 50.5 | 0.5–1 | 0.8 | " | At least 2 months | 24 |
| Example 4 | 4 | 51.7 | 0.3 | 0.4 | " | At least 2 months | 40 |
| Comp. Ex. 1 | 2 | 44.8 | 2 | — | — | Separation in 1 day** | 38 |
| Comp. Ex. 2 | 4 | 48.2 | 0.3 | 1.3 | >24 | At least 2 months | 63 |
| Comp. Ex. 3 | 2 | 40.3 | 3 | — | — | Separation in 1 day** | 30 |
| Comp. Ex. 4 | 4 | 47.1 | 0.5 | 3.5 | 12 | At least 2 months | 53 |

*Based on dry weight relative to the rosin-base material.
**Separation of water.

Table 1 shows that the use of specified sulfonate of the formula [I] or sulfate of the formula [II] according to the invention affords aqueous dispersions having higher mechanical, dilution and storage stabilities and substantially lower foaming properties than those obtained with use of comparison dispersants in Comparison Examples 1 to 4. The use of the dispersant of the invention in an amount of only 2% by weight of the rosin-base material (based on the dry weight) gives an aqueous dispersion which remains stable for at least 2 months as contemplated, whereas the dispersants of the Comparison Examples, if used in the same amount, afford unstable dispersions in which water separates in only 1 day.

<Sizing Test>

The aqueous dispersions prepared in Examples 1 to 4 and Comparison Examples 1 to 4 are used as paper-making sizing agents, and the sizing degrees (seconds) of the papers as measured according to the Stöckigt method (JIS P 8122).

Pulp (L-BKP) beaten to 30° SR is formulated into a 1% aqueous slurry, with which are admixed 0.2% or 0.5% of the aqueous dispersion first, and then 2.5% of alum, based on the dry weight relative to the pulp, to prepare a uniform stock. With use of a TAPPI standard sheet machine, the stock is made into a sheet weighing 60±1 g/m². The sheet is dewatered at a pressure of 5 kg/cm² for 3 minutes, dried at 80° C. for 5 minutes and conditioned at 20° C. and 65% RH for 24 hours. The sizing degree of the paper specimen thus prepared is then measured. Table 2 shows the results.

TABLE 2

| Aqueous dispersion used | Amount of aqueous dispersion | |
|---|---|---|
| | 0.2% | 0.5% |
| Example 1 | 18.6 | 25.9 |
| Example 2 | 23.5 | 28.0 |
| Example 3 | 19.8 | 25.9 |
| Example 4 | 22.0 | 27.5 |
| Comp. Ex. 1 | 2 | 13.5 |
| Comp. Ex. 2 | 20.1 | 26.1 |
| Comp. Ex. 3 | 0 | 8.5 |
| Comp. Ex. 4 | 15.7 | 24.5 |

As apparent from Table 2, compared with the dispersions comprising 4% by weight, based on the rosin-base material, of the comparison dispersants (Comparison Examples 2 and 4), the aqueous dispersions of the invention produce approximately equivalent or higher sizing effects even when comprising only 2% by weight of the sulfonate of the formula [I] (Example 1) or the sulfate of the formula [II] (Example 3); and produce higher sizing effects when comprising 4% by weight of the sulfonate or the sulfate (Examples 2 or 4).

The aqueous dispersions of Comparison Examples 1 and 3 incorporating 2% by weight of comparison dispersants produce only a very low sizing effect and are not fully useful even when used in an amount of 0.5% of the pulp based on the dry weight.

EXAMPLE 5

The procedure of Example 1 is repeated with the exception of using 1% of the sulfonate of the formula [I] based on the rosin-base material to prepare an aqueous dispersion substantially comparable in sizing effect to the dispersion of Example 1.

COMPARISON EXAMPLES 5 AND 6

The procedure of Comparison Examples 1 and 3 is repeated with the exception of using 1% of the dispersants, respectively, relative to the rosin-base material. With no phase inversion taking place, it is impossible to obtain an oil-in-water dispersion in both cases.

EXAMPLES 6 TO 15

Stable aqueous dispersions are prepared in the same manner as in Example 1 with the exception of using the rosin-base material (II) in place of the rosin-base material (I) and also using 4% of the dispersants listed in Table 3 below based on the rosin-base material (II). All the dispersions are composed of particles ranging from 0.2 to 0.3$\mu$ in diameter, remain stable for at least 24 hours when diluted and are preservable stably for at least 2 months.

TABLE 3

| Example | Dispersant |
|---|---|
| 6 | Sodium 2-hydroxy-3-(distyrylphenoxypoly-oxyethylene)propylsulfonate (m = 2, n = 11) |
| 7 | Sodium 2-hydroxy-3-(distyrylphenoxypoly-oxyethylene)propylsulfonate (m = 2, n = 9) |
| 8 | Sodium 2-hydroxy-3-[di(p-methylstyryl)-phenoxypolyoxyethylene)propylsulfonate (m = 2, n = 13) |
| 9 | Ammonium 3-(distyrylphenoxypolyoxyethylene)-propylsulfonate (m = 2, n = 13) |
| 10 | Sodium 2-hydroxy-3-(nonylphenoxypolyoxy-ethylene)propylsulfonate (m = 1, n = 6) |
| 11 | Sodium 2-hydroxy-3-(nonylphenoxypolyoxyethylene)-propylsulfonate (m = 1, n = 9) |
| 12 | Sodium 2-hydroxy-3-(nonylphenoxypolyoxyethylene)-propylsulfonate (m = 1, N = 12) |
| 13 | Ammonium 3-(nonylphenoxypolyoxyethylene)-propylsulfonate (m = 1, n = 9) |
| 14 | Sodium 2-hydroxy-3-(dinonylphenoxypoly-oxyethylene)propylsulfonate (m = 2, n = 10) |
| 15 | Sodium 2-hydroxy-3-(dodecylphenoxypoly-oxyethylene)propylsulfonate (m = 1, n = 15) |

Table 4 shows the mechanical stability and foaming properties of these dispersions. The dispersions are also used as papermaking sizing agents in the same manner as above with the results given in Table 4.

TABLE 4

| | Properties of dispersion | | | |
|---|---|---|---|---|
| | Mechanical | Foaming | Sizing effect (sec) | |
| | Stability | properties | Amount | |
| Example | (%) | (mm) | 0.2% | 0.5% |
| 6 | 0.3 | 30 | 21.2 | 26.8 |
| 7 | 0.4 | 38 | 23.1 | 28.1 |
| 8 | 0.2 | 35 | 22.0 | 27.2 |
| 9 | 0.5 | 40 | 23.0 | 28.5 |
| 10 | 0.4 | 30 | 23.5 | 28.0 |
| 11 | 0.2 | 48 | 21.0 | 26.2 |
| 12 | 0.3 | 35 | 22.1 | 27.1 |
| 13 | 0.6 | 28 | 23.1 | 28.3 |
| 14 | 0.2 | 28 | 23.1 | 26.9 |
| 15 | 0.4 | 51 | 21.7 | 27.5 |

EXAMPLE 16

The procedure of Example 3 is repeated with the exception of using 1% of the sulfate of the formula [II] based on th rosin-base material to prepare an aqueous dispersion substantially comparable in sizing effect to the dispersion of Example 3.

EXAMPLES 17 TO 20

Stable aqueous dispersions are prepared in the same manner as in Example 3 with the exception of using the rosin-base material (II) in place of the rosin-base material (I) and also using 6% of the dispersants listed in Table 5 below based on the rosin-base material (II). All the dispersions are composed of particles ranging from 0.2 to 0.3μ in size.

TABLE 5

| Example | Dispersant |
|---|---|
| 17 | Sodium salt of polyoxyethylene(p = 9)distyryl-phenylether sulfuric acid half ester |
| 18 | Sodium salt of polyoxyethylene(p = 11)di(p-methylstyryl)phenylether sulfuric acid half ester |
| 19 | Sodium salt of polyoxyethylene(p = 15)distyryl-phenylether sulfuric acid half ester |
| 20 | Ammonium salt of polyoxyethylene(p = 13)di(α-methylstyryl)phenylether sulfuric acid half ester |

These dispersions are used as sizing agents for papermaking in the same manner as above. Table 6 shows the results.

TABLE 6

| | Amount of aqueous dispersion | |
|---|---|---|
| Example | 0.2% | 0.5% |
| 17 | 21.3 | 25.8 |
| 18 | 20.5 | 25.5 |
| 19 | 22.3 | 27.0 |
| 20 | 21.5 | 26.3 |

We claim:

1. A process for preparing an aqueous dispersion of a rosin-base material by mixing together a melt of the rosin-base material, a dispersant and water to obtain a dispersion comprising a continuous phase of the rosin-base material and a dispersed phase of the water, and adding water to the dispersion to invert the dispersion to the contemplated aqueous dispersion comprising a dispersed phase of the rosin-base material and a continuous phase of the water, said rosin-base material comprising 0 to 95% by weight of rosins and 5 to 100% by weight of fortified rosins, the process being characterized in that the dispersant is at least one salt of sulfuric acid half ester represented by the formula

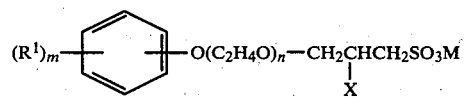

[I]

wherein $R^1$ is a hydrocarbon residue having 4 to 18 carbon atoms, m is an integer of 1 or 2, n is an integer of 4 to 25, X is hydrogen or hydroxyl, and M is a monovalent cation.

2. A process as defined in claim 1 wherein $R^1$ is straight-chain or branched-chain alkyl having 4 to 18 carbon atoms.

3. A process as defined in claim 1 wherein $R^1$ is straight-chain or branched-chain alkyl having 4 to 18 carbon atoms, m is 1 or 2, and the total number of carbon atoms of the group $(R^1)_m$ is 4 to 30.

4. A process as defined in claim 3 wherein the total number of carbon atoms of the group $(R^1)_m$ is 6 to 25.

5. A process as defined in claim 1 wherein $R^1$ is an aromatic hydrocarbon residue represented by the formula

wherein $R^3$ is hydrogen or lower alkyl, and B is straight chain or branched-chain alkylene having 1 to 3 carbon atoms.

6. A process as defined in claim 1 wherein $R^1$ is an aromatic hydrocarbon residue represented by the formula

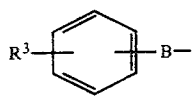

in which $R^3$ and B are as defined above, and m is 2.

7. A process as defined in claim 1 wherein $R^1$ is an aromatic hydrocarbon residue represented by the formula

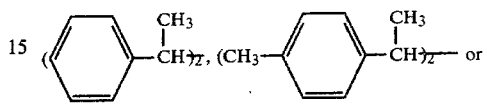

in which $R^3$ and B are as defined above, m is 2, and the total number of carbon atoms of the group $(R^1)_m$ is 14 to 20.

8. A process as defined in claim 7 wherein the group $(R^1)_m$ is

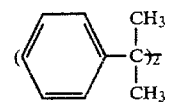

9. A process as defined in claim 1 wherein n is an integer of 6 to 17.

* * * * *